UNITED STATES PATENT OFFICE.

SAML. F. HILTON, OF PROVIDENCE, AND WM. D. HILTON, OF CRANSTON, RHODE ISLAND, ASSIGNEES OF SAID SAMUEL F. HILTON.

IMPROVED CEMENT FOR UNITING LEATHER AND OTHER SUBSTANCES.

Specification forming part of Letters Patent No. 33,065, dated August 13, 1861; Reissue No. 1,471, dated May 5, 1863.

*To all whom it may concern:*

Be it known that we, SAMUEL F. HILTON, of the city and county of Providence, in the State of Rhode Island, did invent a new and useful Cement for Various Purposes; and we do hereby declare that the following specification is a full and complete description thereof.

The invention consists in the discovery that when that peculiar astringent principle of vegetables which is known by the name of "tannin," and which is the agent by which animal skin is converted into leather, is combined with that principle found in the tendons, ligaments, cartilage, and bones of animals, and in the sounds of fish, which is known under the name of "gelatine," the result will be, after a process of manufacture hereinafter described, an adhesive cement which is perfectly insoluble in either water or oil.

For the purpose of enabling others to compound the article, we will state the proportions of each element which can most advantageously be employed and the process of combining them.

Take three pounds of gelatine and one pound of tannin. Dissolve the former in about one wine-gallon of water at a temperature of 212° of Fahrenheit. Dissolve in a separate vessel the tannin in one-half a gallon of alcohol at the ordinary temperature of the atmosphere. Next, throw the two solutions together and suffer them to stand until cold, when it will be found that the tannin and gelatine have combined in the form of a thick viscid precipitate. The mass should then be heated over a slow fire to the temperature of about 106° Fahrenheit until the water and alcohol have become separated from the combined tannin and gelatine and been thrown off by evaporation. This latter process, which should be accompanied with agitation of the mass, by stirring, in addition to effecting a separation of the solvents from the respective elements, modifies the character of the composition itself, and thoroughly effects the combination of the elements. If a more complete union of the elements is thought advisable, add to the mixture, after the last-described process, one pound of vinegar and one pound of alcohol for every two pounds of the composition, and boil until the mass is homogeneous and of the consistency desired. This last-named process, however, is not essential to the production of the article, but is of value in those cases where the process previously described has not been attended with the best results.

The cement which it is thus enabled to produce has been found superior to any other composition for uniting leather belting or strips of leather together. As it is perfectly insoluble in either water or oil, it is especially adapted for belts or bands which are to be used in a moist or damp place, and for securing together the pieces of leather which compose the entire sole of a boot or shoe.

The best method of applying the cement is to place it in a suitable vessel and raise it to the boiling-point; then spread the composition upon the surfaces to be united and confine them under pressure until the cement has become cold.

We wish it to be distinctly understood that the invention which is the subject of this patent does not consist in the use of the precise formula above given, nor in the particular method by which the elements composing the cement are made to combine together, inasmuch as tannin and gelatine may be dissolved by various other agents than those described, and may be combined in other proportions, so as to produce a composition of matter of substantially the same chemical character, and possessing similar useful qualities to those which distinguish this invention.

What we do claim as the invention, and desire to secure by Letters Patent as a new article of manufacture, is—

A cement made from the two materials heretofore first mentioned in combination, substantially as described.

SAML. F. HILTON.
WM. D. HILTON.

Witnesses:
BENJ. F. THURSTON,
THOS. H. PEABODY.